Aug. 13, 1929.  A. STORM  1,724,379
MANURE SPREADER
Filed March 21, 1925  5 Sheets-Sheet 1
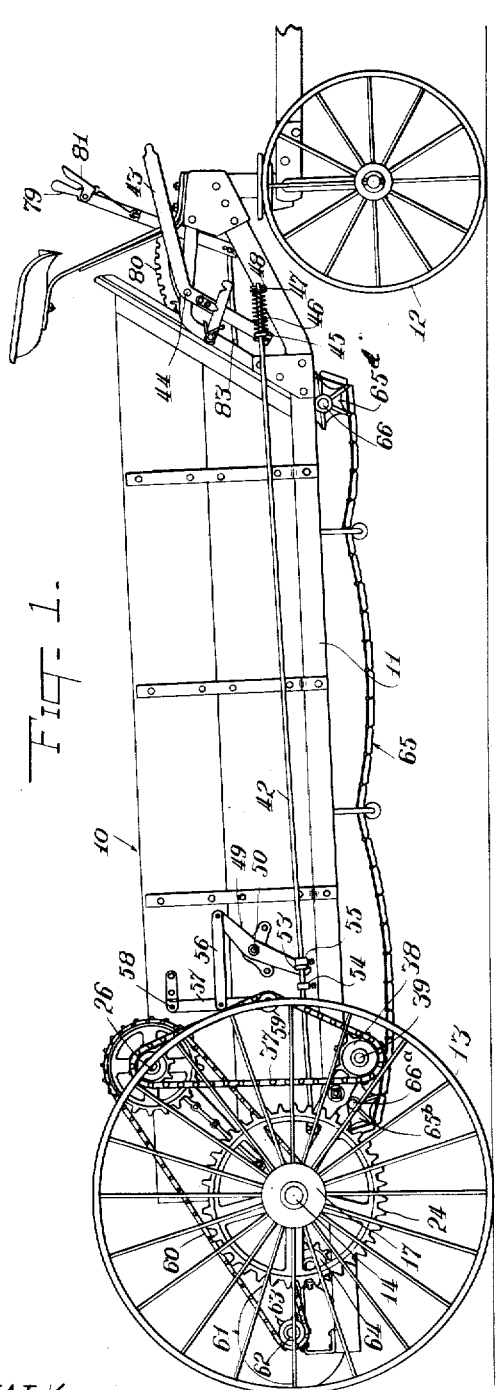
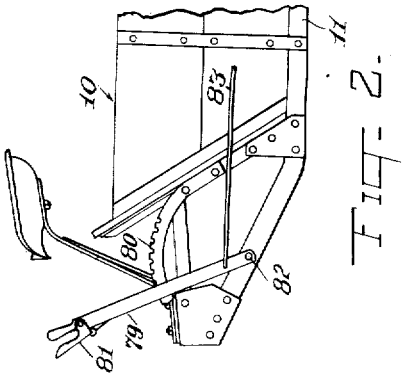

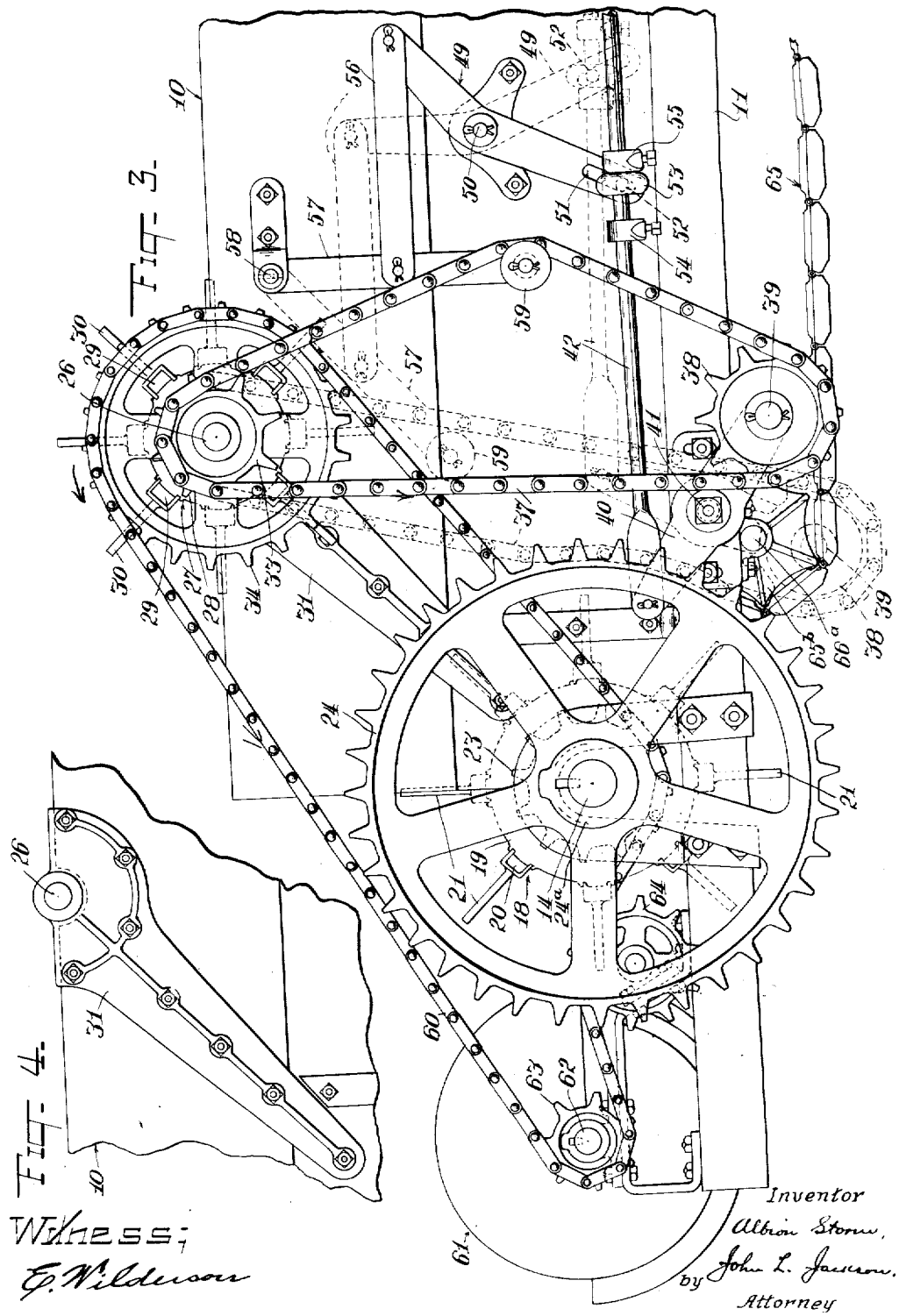

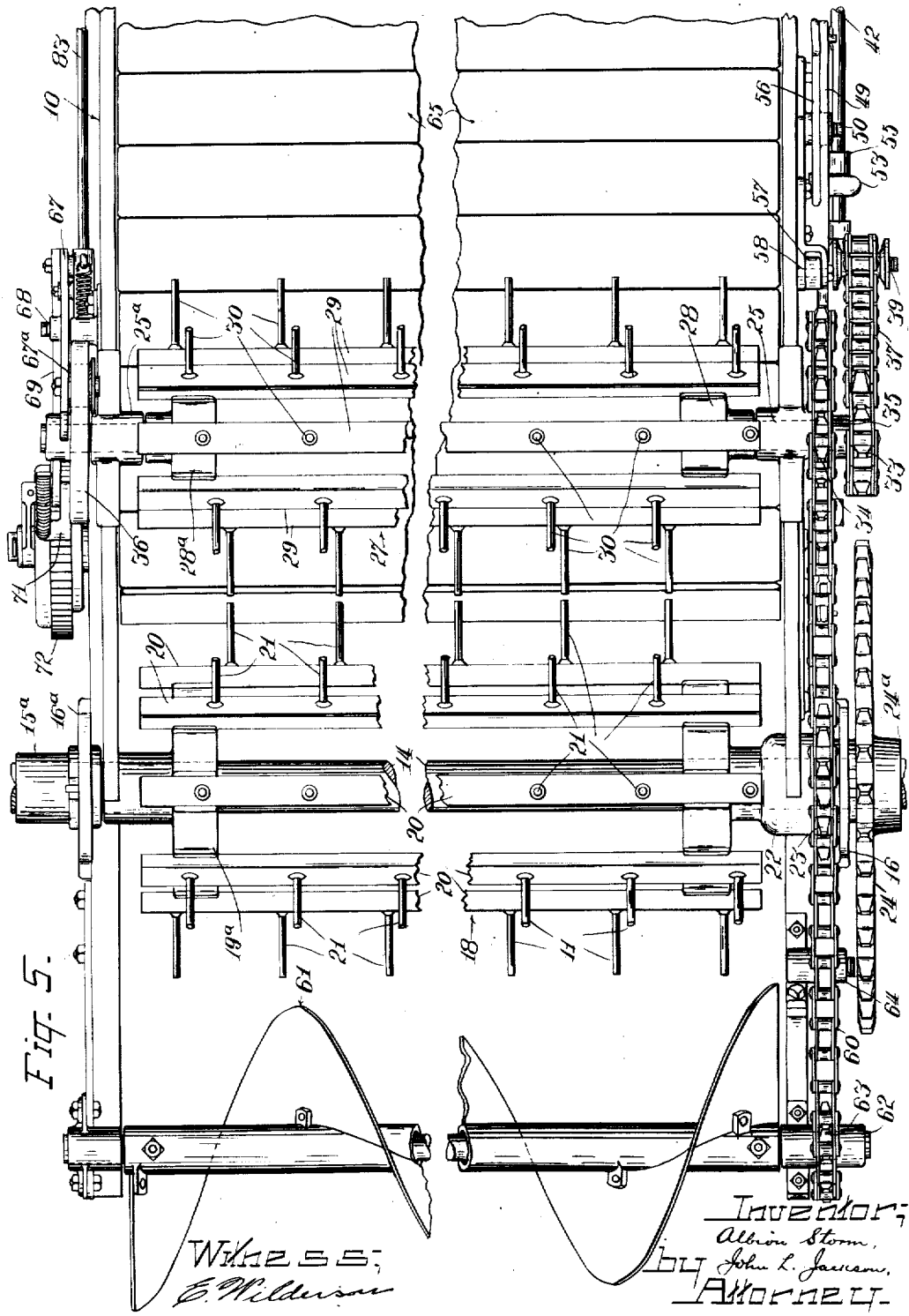

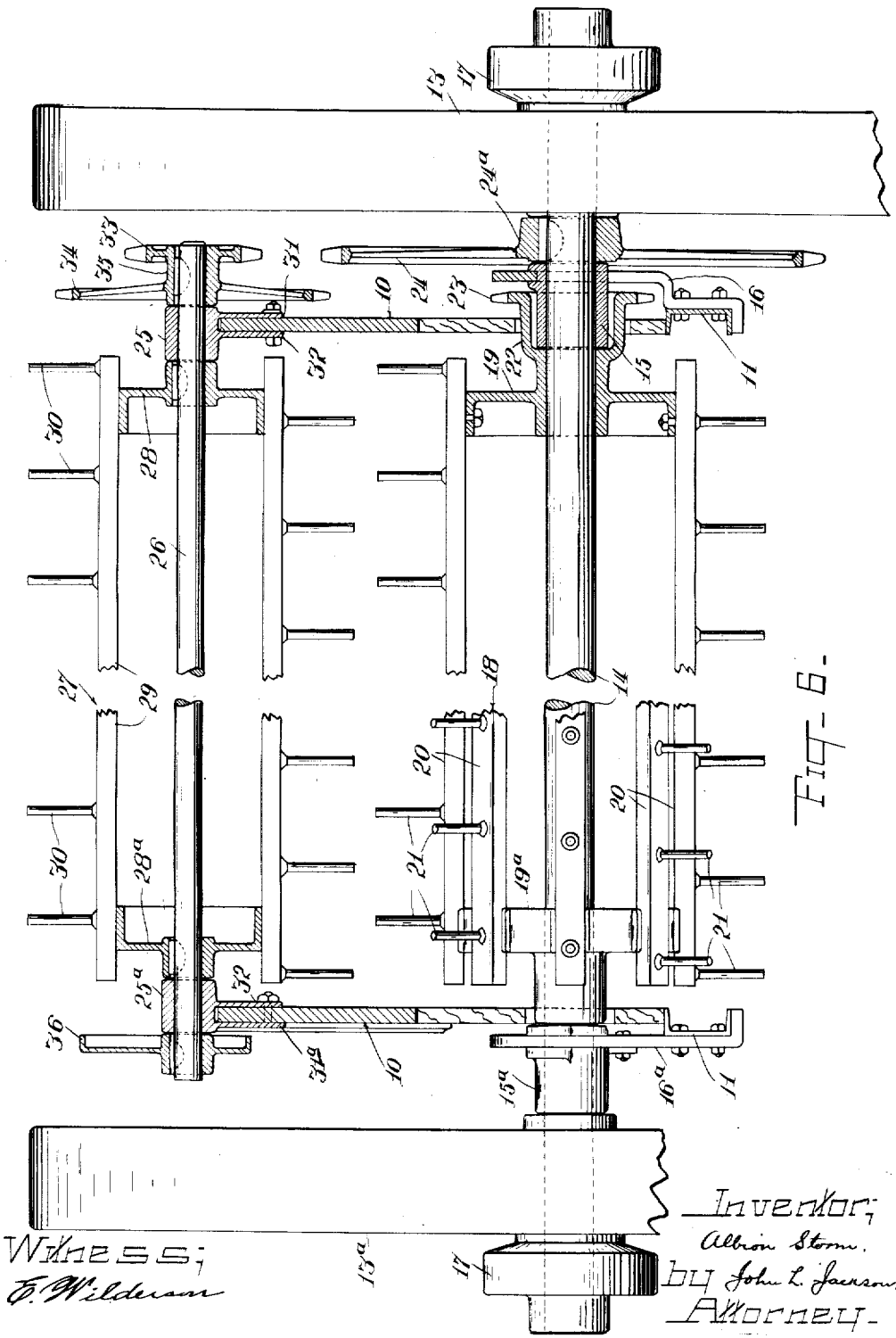

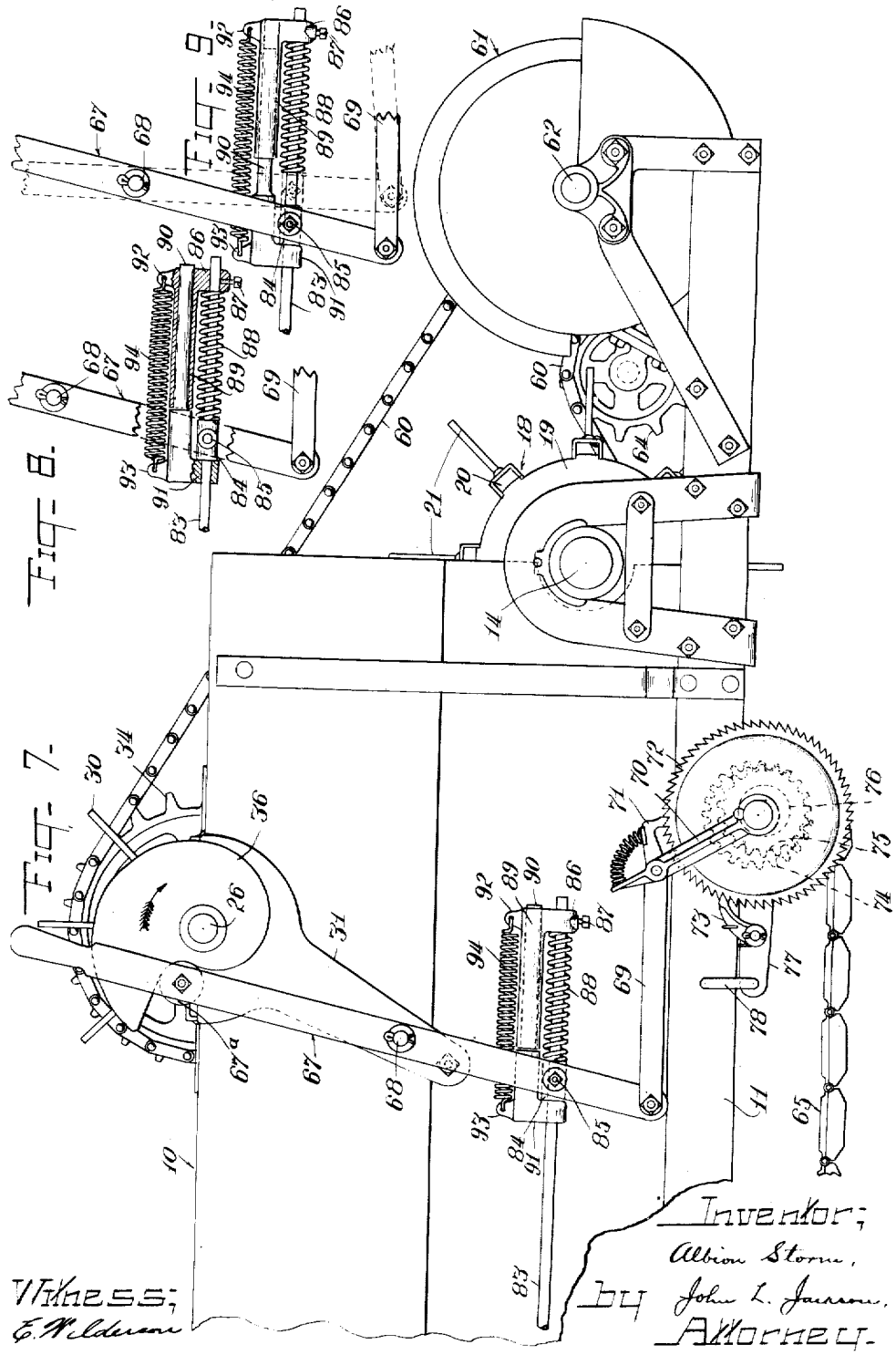

Patented Aug. 13, 1929.

1,724,379

UNITED STATES PATENT OFFICE.

ALBION STORM, OF SHERKSTON, ONTARIO, CANADA, ASSIGNOR TO DEERE & COMPANY, OF MOLINE, ILLINOIS, A CORPORATION OF ILLINOIS.

MANURE SPREADER.

Application filed March 21, 1925. Serial No. 17,321.

My invention relates to manure spreaders of the well-known type comprising a vehicle body mounted on front and rear wheels, a traction driven rear axle on which the rear wheels are mounted, and by the forward rotation of which it is driven, a rotary beater mounted on the rear axle, and a traveling apron, the upper course of which forms the bottom of the vehicle and by the intermittent rearward movement of which the contents of the vehicle are gradually fed rearwardly to the beater. Heretofore much difficulty has been encountered by manufacturers of manure spreaders in devising means for driving the beater which will operate satisfactorily under the burdensome conditions that attend the use of implements of this kind, and one of the objects of my invention is to provide improved means for that purpose which will not be subject to the objections that apply to the driving devices heretofore employed. Another object is to adapt my improved driving devices for use on manure spreaders equipped with an auxiliary beater, and also with a lateral distributor located in rear of the main beater. Such auxiliary beaters and wide distributors have heretofore been provided, but the means for driving the same have not been found to be entirely satisfactory. I accomplish these objects as illustrated in the drawings and as hereinafter described. What I regard as new is set forth in the claims.

In the accompanying drawings,—

Fig. 1 is a side elevation of a manure spreader embodying my improvements;

Fig. 2 is a detail, being a partial side elevation of the front portion of the spreader showing the manually operated lever for adjusting the rate of feed;

Fig. 3 is an enlarged partial side elevation of the rear portion of the spreader showing my improved driving mechanism;

Fig. 4 is a detail, being a partial side view of the rear portion of the vehicle body showing one of the brackets employed to support a countershaft that carries the auxiliary beater and some parts of the driving mechanism;

Fig. 5 is a plan view of the rear portion of the spreader, some parts being broken away;

Fig. 6 is a transverse sectional detail, showing certain parts of the driving mechanism;

Fig. 7 is a side elevation of the rear portion of the spreader, showing the opposite side thereof from that shown in Fig. 3, and illustrating the mechanism for actuating the feeding apron and for regulating the rate of feed; and Figs. 8 and 9 are details, showing different positions of the feed regulating mechanism.

Referring to the drawings,—10 indicates the usual vehicle body and 11 the side sills thereof, 12 the front wheels and 13, 13$^a$ the rear wheels. The rear wheels are mounted on a rear axle 14 journaled on the vehicle body in any suitable way, but preferably in boxes 15, 15$^a$ carried by brackets 16, 16$^a$ secured to the side sills 11, as shown in Fig. 6. It will be understood that the rear wheels 13 are connected with the rear axle 14 by means of the usual ratchet connections contained in housings 17, so that forward rotation of the wheels will drive the rear axle, but said wheels will be free to rotate in the opposite direction independently of the axle, as is necessary in rounding curves.

Loosely mounted on the rear axle 14 is a main beater 18, of any approved design, preferably consisting of spiders or heads 19, 19$^a$ cross-connected by bars 20 provided with radial fingers 21. The head 19 is provided with an outwardly extending axial sleeve 22 that extends over the inner end portion of the journal box 15, as best shown in Fig. 6, and carries a sprocket wheel 23 which, as shown in said figure, is located between the proximate side of the vehicle body and the adjacent ground wheel 13. Mounted on and keyed to the rear axle 14 adjacent to the sprocket wheel 23 is a large driving sprocket wheel 24, the hub 24$^a$ of which lies between the journal box 15 and the inner end of the hub of the wheel 13.

Journaled in suitable bearings 25, 25$^a$ supported by the upper rear portion of the vehicle body is a countershaft 26, which in the embodiment of my invention illustrated is designed to carry an auxiliary beater 27, comprising heads 28, 28$^a$ mounted on the end portions of the countershaft 26 and connected by cross-bars 29 provided with radial fingers 30, best shown in Fig. 6. The heads 28, 28$^a$ are keyed to the countershaft 26 so that they rotate therewith. Preferably the bearings 25, 25$^a$ are formed in brackets 31, 31$^a$ secured to the side boards of the vehicle body and provided with inwardly projecting flanges 32 that bear against the inner portions of said side boards, thereby securing said brackets more firmly in position.

The countershaft 26 is somewhat longer than the width of the vehicle body, and at the end adjacent to the ground wheel 13 it carries a small sprocket wheel 33 and a larger sprocket wheel 34, which are preferably made integral with each other, being connected by a hub 35 that fits upon and is keyed to the countershaft 26, as shown in Fig. 6. It should be understood that while my improved driving mechanism is well adapted for use in connection with manure spreaders provided with an auxiliary beater and with a lateral distributor, it is also applicable to manure spreaders not equipped with such elements, and the term "countershaft" as herein used is therefore intended to comprehend either a shaft that extends entirely across the vehicle body, or any sufficient means for supporting and connecting the sprocket wheels 33, 34 so that they are operatively connected together and serve as power transmitting devices in the manner hereinafter described. At the opposite end of the countershaft 26 from that which carries the sprocket wheels 33, 34, it is provided with a cam 36 keyed thereto, by means of which the feeding mechanism is actuated, as will be hereinafter described.

The sprocket wheel 33, and through it the countershaft 26, is driven by a link belt 37 which travels around said sprocket wheel and depends therefrom at the side of the vehicle body, the lower portion of said belt being supported by a pinion 38, preferably in the form of a small sprocket wheel, which is mounted on a stud 39 carried by one arm of a lever 40 fulcrumed upon a pivot 41, so that it may swing in a vertical plane, and thereby move the pinion 38 fore and aft. As shown in Fig. 3, the link belt 37 travels around the pinion 38, and consequently by swinging the lever 40 about its pivot the lower end of said belt may be swung fore and aft to move it into or out of engagement with the teeth of the driving sprocket wheel 24. For swinging the lever 40 I provide an operating rod 42, the rear end of which is connected with the upper arm of said lever, while the forward end of said rod is connected to a manually operated lever 43 fulcrumed at 44 adjacent to the driver's seat, so that it may conveniently be operated. The connections between the rod 42 and lever 43 comprise an eye 45 projecting laterally from the lower portion of said lever, through which eye the front end of the rod 42 extends, and a spring 46 mounted on said rod between the eye 45 and a collar 47 secured on said rod by a cotter pin 48, as shown in Fig. 1. The spring 46, therefore, serves as a cushioning device between the lever 43 and the rod 42.

It will be obvious from an inspection of Fig. 3 that rocking of the lever 40 varies the length of the loop formed by the link belt 37, and therefore it is necessary to provide means for compensating for this variation. This is accomplished by providing a lever 49 that is fulcrumed between its ends at 50 at the side of the vehicle body, as shown in Fig. 3, so that it swings in a vertical plane. The lower end of said lever is provided with a slot 51 that receives the stem 52 of an eye-bolt 53 through which the rod 42 extends. At opposite sides of said eye-bolt the rod 42 is provided with adjustable collars 54, 55 set a short distance apart, so that a little lost motion is provided between the lower end of the lever 49 and the rod 42. The upper end of said lever is connected by a link 56 with a fore and aft swinging bar 57 pivoted at its upper end to the side of the vehicle body by a pivot 58, as shown in Fig. 3. The lower end of said bar carries a roller 59 over which the forward course of the link belt 37 travels, so that said roller serves as a belt tightener.

It will be apparent from the foregoing description that longitudinal movement of the rod 42 to rock the lever 40 will at the same time rock lever 49, and therefore move the roller 59 longitudinally of the machine in conformity with the fore and aft swinging of the belt 37, as clearly indicated by the dotted lines in Fig. 3. Widening of said belt of course shortens its length, and therefore by the means described said belt is always maintained taut. Also it will be seen that swinging of the lever 40 in one direction or the other will move the belt 37 into or out of operative engagement with the driving sprocket wheel 24. When said belt is in engagement with the driving sprocket wheel, the sprocket wheels 33, 34 will be driven continuously, as distinguished from the intermittent driving of the feeding mechanism hereinafter described, and the countershaft 26 and through it the auxiliary beater 27 and the cam 36 will also be driven continuously.

For driving the main beater 18 a link belt 60 is provided that travels around and is driven by the sprocket wheel 34, the lower course of said belt passing under and operatively engaging the sprocket wheel 23 which is connected with the main beater 18, as has been described. Thus said beater is continuously driven from the countershaft 26 and in the same direction, which direction is opposite to that in which the sprocket wheel 24 and rear axle 14 rotate. In the construction illustrated the machine is provided with a lateral distributor 61, of the well-known helical type, carried by a transverse shaft 62 provided with a sprocket wheel 63, as shown in Figs. 3 and 5. The latter sprocket wheel is driven by the link belt 60, which, as best shown in Fig. 3, travels around the same, and over an idler sprocket wheel 64 by which its tension is regulated, said sprocket wheel 64 being mounted in adjustable bearings for that purpose.

By my improved construction I provide for mounting the main beater so that it rotates about the rear axle of the spreader, either co-axially therewith, or in more or less eccentric relation thereto, and for rotating it at a much higher rate of speed than that at which the axle or the rear wheels of the spreader rotate, without using the more or less complicated trains of gearing that have heretofore been employed, and which are objectionable not only because of high manufacturing cost, but also because they involve problems of housing, lubrication, wear and replacement that are not encountered in my present construction. It will be noted that while the main beater 18 is mounted on the rear axle, it is not driven directly by said axle or by the rear wheels, but driving power is transmitted to it from the countershaft 26, which is located at a point outside the periphery of the beater, and is itself positively driven, in the present instance from the drive sprocket 24 through the belt 37. Obviously, any desired speed ratio between the rear axle and the main beater may be provided, but the proportions shown by which the beater rotates approximately nine times as fast as the rear axle and wheels has been found to operate very satisfactorily. The construction described also provides convenient means for starting and stopping the main beater, as well as the auxiliary beater and the lateral distributor, where such elements are provided. So far as I am aware, it is broadly new to mount the main beater of a manure spreader on the rear axle of the vehicle and to drive it from a power driven countershaft mounted eccentrically to the axis of the beater; also to drive such countershaft from the rear axle. I am aware that it is not broadly new to provide a swinging link belt, of the general type herein shown and described, for driving an auxiliary beater, but I believe it to be new to employ such mechanism to drive a main beater mounted to rotate about the rear axle of a spreader.

The bottom of the vehicle body is formed by an endless apron 65 operating over suitable rotary supports 65$^a$, 65$^b$ carried by transverse shafts 66, 66$^a$ at opposite ends of the vehicle, so that the upper course of said apron lies between the side sills 11. The load to be distributed is fed rearwardly by intermittently moving the upper course of said apron in that direction through suitable mechanism driven from the rear axle 14, as will now be described. It has already been explained that the cam 36 carried by the countershaft 26 actuates the feeding mechanism, and by reference to Fig. 7 it will be seen that a lever 67 is associated with said cam to be rocked fore and aft thereby about a pivot 68. Said lever is provided with a roller 67$^a$ that bears against the periphery of the cam 36, and obviously when said cam rotates in the direction indicated by the arrow in Fig. 7, it will act to swing the upper end of said lever to the left as viewed in said figure. The lower end of said lever is connected by a link 69 with a radial arm 70 mounted on the shaft 66$^a$ and provided with a pawl 71 adapted to engage the teeth of a ratchet wheel 72 also mounted on said shaft. A detent 73 serves to prevent reverse rotation of said ratchet wheel. The ratchet wheel 72 is loosely mounted on the shaft 66$^a$, and is arranged to be operatively connected therewith by means of an internal gear 74 carried by said ratchet wheel and a spur gear 75 mounted on the eccentric hub 76 of said ratchet wheel, said spur gear being held against rotation by a dog 77 pivotally connected with one of the side sills 11 by a link 78. A device of this character is fully shown and described in Letters Patent No. 1,215,614 to Theophilus Brown, dated February 13, 1917, and therefore need not be explained in detail herein. It will suffice to say that as the ratchet wheel 72 is rotated in a clockwise direction as viewed in Fig. 7, the upper course of the apron 65 is caused to travel rearwardly. It will be evident that inasmuch as the cam 36 actuates the lever 67 intermittently, the ratchet wheel 72 will be rotated intermittently, and consequently the movement of the apron is intermittent also. As the cam 36 is mounted on the countershaft 26, whenever the auxiliary beater is driven the apron 65 will be actuated, but the movement of the beater will be continuous whereas that of the apron will be intermittent, notwithstanding that they are both actuated by said countershaft. It is manifest, also, that the main and auxiliary beaters will both be driven at a higher rate of speed than the apron.

It is occasionally necessary or desirable to change the rate of travel of the apron, or, in other words, the distance it is moved on each operative stroke of the lever 67, and my improved construction provides means by which the operator can make such adjustment without leaving his seat and also without having to move the load in accomplishing it. For accomplishing this purpose a feed adjusting lever 79 is provided, which is mounted on the vehicle body adjacent to the driver's seat, as shown in Fig. 2, and has associated therewith any suitable locking means for holding it in a fixed position, such as a notched sector 80 and the usual hand operated latch 81. The lever 79 is fulcrumed at 82, so that it swings fore and aft, and to it is connected the forward end of a rod 83 which extends back to and a short distance beyond the lever 67, as best shown in Fig. 7. The rear end of said rod is supported by a sleeve 84 which is pivotally connected with the lower portion of the lever 67 by a pivot 85, so that it may rock about a transverse axis. Said rod is adapted to slide in said sleeve, and the rear end of said rod carries a fixed stop 86 secured thereto in any suitable way, as by a set screw 87, so that it may be adjusted longitudinally thereof should occasion require. Between the stop 86 and the sleeve 84 is a cushioning spring 88 mounted on the rod 83. The stop 86 is provided with a sleeve 89 that extends toward the lever 67 parallel with the rod 83, which sleeve is adapted to receive a plunger 90 that projects rearwardly from a movable stop 91 fitted loosely on the rod 83 in advance of the sleeve 84, against the forward end of which it bears. The stop 86 is provided with a lug 92, and the stop 91 is provided with a lug 93, as shown in Fig. 7, which lugs are connected by a spring 94 which tends to hold the two stops together, with the plunger 90 incased by the sleeve 89.

It will be seen from the foregoing description that the sleeve 84 connected with the lever 67 is interposed between the stationary stop 86 and the movable stop 91, and that when said lever is given an operative stroke, or, in other words, is swung in a counter-clockwise direction as viewed in Fig. 7, and the rod 83 is held against endwise movement by the locking devices associated with the lever 79, as is normally the case, the rearward movement of the lower end of the lever 67 will compress the spring 88, which will not only cushion it, but after the roller 67ª passes off the high part of the cam 36 will restore the lever 67 to its normal position. When the parts are as shown in Fig. 7, the apron 65 will advance the greatest possible distance upon each operative stroke of the lever 67, since the roller 67ª is shown as being in engagement with the lowest part of the cam 36, and rotation of the cam will consequently move it the greatest distance that said cam is capable of moving it. By, however, setting the lever 67 so that its normal position when retracted is such that the roller 67ª is not in contact with the cam at that time, but is removed therefrom to a greater or less extent, obviously rotation of the cam will not give the lever so long a stroke, and consequently the apron 65 will not be moved so far each time said lever is actuated. This setting may be effected by moving the lever 79 rearwardly, thereby moving the stop 86 rearwardly from the position shown in Fig. 7, as illustrated in Fig. 9. When this is done it will tend to stretch the spring 94, since the movable stop 91 will be kept from following up the stop 86 under the influence of said spring because of the resistance presented to movement of the lever 67 by the load. Consequently the parts will then assume the position shown in Fig. 9, and will retain such position until the cam 36 is rotated the next time. When this occurs the lever 67 will be rocked by means of said cam, thereby moving the sleeve 84 back into engagement with the spring 88 and permitting the movable stop 91 to return to its normal distance from the fixed stop 86. After the high part of the cam 36 passes off of the rollers 67ª, the spring 88 will move the lever 67 in the reverse direction, but its upper end will not be carried back so far as it was before the adjustment of the rod 83 was effected, because, owing to the rearward movement of said rod, the position of the stops 91 and 86 will have been shifted rearwardly, and therefore the stop devices as a whole will tend to hold the sleeve 84 normally at a point to the right of its first position, as indicated by the dotted lines in Fig. 9. This will throw the roller 67ª to the left of the position shown in Fig. 7, to a greater or less extent, depending on how much of an adjustment has been made, and therefore the next time the cam 36 operates, and in all succeeding operations thereof until the feeding devices have again been adjusted, the stroke of the lever 67 effected by the operation of said cam will be shortened more or less in accordance with the adjustment made. In other words, the normal position of the lever 67 with respect to the cam 36 is varied, with consequent variation in the length of the operative stroke of said lever. In making this adjustment the operator does not have to move the load, but he merely manipulates the stop devices that control the normal position of the lever 67, independently of the load, so that the next time the lever is actuated by the power mechanism, it will return to its new normal position and will continue to use that position until further adjustment is made by the operator.

While I prefer to embody my invention as specifically illustrated and described herein, I wish it to be understood that it is not limited to such specific construction, except in so far as claims may be directed thereto, as it will be apparent that various changes and modifications of such structure may be made without departing from the invention pointed out in the generic claims.

What I claim as my invention and desire to secure by Letters Patent, is:—

1. In a manure spreader of the type comprising a vehicle body having a rear axle, a rotatable beater mounted on the rear axle, and means for feeding manure to said beater; driving mechanism for driving said beater comprising a countershaft mounted on the vehicle body, a driving connection between said beater and said countershaft, and power operated means operable to drive said countershaft continuously.

2. In a manure spreader of the type comprising a vehicle body having a rear axle, a rotatable beater mounted on the rear axle, and means for feeding manure to said beater; driving mechanism for driving said feeding means comprising a countershaft mounted on the vehicle body, power operated means operable to drive said countershaft continuously, and means operated by said countershaft for intermittently actuating said feeding means; and means for driving said beater from said countershaft.

3. In a manure spreader of the type comprising a vehicle body having a rotatable rear axle, a rotatable beater, and means for feeding manure to said beater; driving mechanism for said beater and said feeding means comprising a countershaft mounted on the vehicle body, means for driving said beater from said countershaft and in the same direction, a cam means operated by the rotation of said countershaft for intermittently actuating said feeding means, and means operable to continuously drive said countershaft from said axle.

4. In a manure spreader of the type comprising a vehicle body having a rotatable rear axle, a rotatable beater loosely mounted on said axle, and means for feeding manure to said beater; driving mechanism for said beater and said feeding means comprising a countershaft mounted on the vehicle body, means for driving said beater from said countershaft, means actuated by the rotation of said countershaft for intermittently actuating said feeding means, and means operable to continuously drive said countershaft from said axle.

5. In a manure spreader of the type comprising a vehicle body having a rear axle, a rotatable beater loosely mounted on the rear axle, and means for feeding manure to said beater; driving mechanism for driving said beater comprising a countershaft mounted on the vehicle body, a sprocket wheel mounted on and rotating with said countershaft, a sprocket wheel connected to rotate with the beater, a link belt operatively connecting said sprocket wheels, and means operable to continuously drive said first mentioned sprocket wheel from one of the vehicle wheels, said driving mechanism being arranged to rotate the beater oppositely to the direction of rotation of the vehicle wheels.

6. In a manure spreader of the type comprising a vehicle body having a traction driven rear axle, a rotatable beater loosely mounted on said axle, and means for feeding manure to said beater; driving mechanism for said beater comprising a countershaft mounted on the vehicle body, means for driving said beater from said countershaft, and means operable to continuously drive said countershaft from said axle.

7. In a manure spreader of the type comprising a vehicle body having a rear axle, a rotatable beater, and means for feeding manure to said beater; driving mechanism for said beater and said feeding means comprising a countershaft mounted on the vehicle body, sprocket wheel and chain mechanism for driving said beater from said countershaft and in the same direction, means actuated by continuous rotation of said countershaft to intermittently actuate said feeding means, and sprocket wheel and chain mechanism operable to drive said countershaft at higher speed from one of the vehicle wheels, but in a reverse direction.

8. In a manure spreader of the type comprising vehicle body having a rotatable rear axle, a rotatable beater loosely mounted on said axle, and means for feeding manure to said beater; driving mechanism for said beater and said feeding means comprising a countershaft mounted on the vehicle body, sprocket wheel and chain mechanism for driving said beater from said countershaft, means actuated by continuous rotation of said countershaft to intermittently actuate said feeding means, and sprocket wheel and chain mechanism operable to drive said countershaft at higher speed from said axle.

9. In a manure spreader of the type comprising a vehicle body having a rear axle, a main rotatable beater loosely mounted on said axle, means for feeding manure to said beater, and an auxiliary rotatable beater mounted on the upper portion of the vehicle body; driving mechanism for said beaters comprising a countershaft mounted on the vehicle body and connected with said auxiliary beater, means for driving said main beater from said countershaft and in the same direction, and means operable to drive said countershaft from one of the vehicle wheels.

10. In a manure spreader of the type comprising a vehicle body having a rear axle, a main rotatable beater, means for feeding manure to said beater, and an auxiliary rotatable beater mounted on the upper portion of the vehicle body; driving mechanism for said beaters comprising a countershaft on the upper portion of the vehicle body and connected with said auxiliary beater, means for driving said main beater from said countershaft and in the same direction, means operable to continuously drive said countershaft from one of the vehicle wheels, and means operable by the rotation of said countershaft to intermittently actuate said feeding means.

11. In a manure spreader of the type comprising a vehicle body having a rotatable rear axle, a main rotatable beater loosely mounted on said axle, means for feeding manure to said beater, and an auxiliary rotatable beater mounted on the upper portion of the vehicle body; driving mechanism for said beaters comprising a countershaft mounted on the upper portion of the vehicle body and connected with said auxiliary beater, means for driving said main beater from said countershaft and in the same direction, means operable to drive said countershaft from said axle and means operable by the rotation of said countershaft to intermittently actuate said feeding means.

12. In a manure spreader of the type comprising a vehicle body having a rear axle, a rotatable beater mounted on said axle, and means for feeding manure to said beater; driving mechanism for said beater comprising a countershaft mounted on the vehicle body, sprocket wheel and chain mechanism for driving said beater from said countershaft, and sprocket wheel and chain mechanism for driving said countershaft from one of the vehicle wheels, said sprocket wheel and chain mechanisms being arranged to rotate said beater oppositely to the direction of rotation of the vehicle wheels.

13. In a manure spreader of the type comprising a vehicle body having a rear axle, a main beater mounted on said axle, an auxiliary beater mounted on the upper portion of the vehicle body, and means for feeding manure to said beaters; driving mechanism for said beaters comprising a countershaft mounted on the vehicle body and operatively connected with said auxiliary beater, sprocket wheel and chain mechanism for driving said main beater from said countershaft and in the same direction, and sprocket wheel and chain mechanism for driving said countershaft from one of the vehicle wheels and in the opposite direction.

14. In a manure spreader of the type comprising a vehicle body having a rotatable rear axle, a rotatable beater loosely mounted on said axle, and means for feeding manure to said beater; driving mechanism for said beater comprising a countershaft mounted on the vehicle body, sprocket wheel and chain mechanism for driving said beater from said countershaft, a driving sprocket wheel rotated by said axle, a driven sprocket wheel mounted on and rotating with said countershaft, a link belt running on the latter sprocket wheel and movable into or out of engagement with said driving sprocket wheel, and means operable to move said link belt to operatively connect, or to disconnect, said sprocket wheels.

15. In a manure spreader of the type comprising a vehicle body having a rotatable rear axle, a rotatable beater loosely mounted on said axle, and means for feeding manure to said beater; driving mechanism for driving said beater comprising a driving sprocket wheel rotating with said axle, a countershaft mounted on the upper portion of the vehicle body, a sprocket wheel mounted on and rotating with said countershaft, a link belt running over the latter sprocket wheel and mounted to swing fore and aft into and out of engagement with said driving sprocket wheel, and means for driving the beater from said countershaft.

16. In a manure spreader of the type comprising a vehicle body having a rotatable rear axle, a rotatable beater loosely mounted on said axle, and means for feeding manure to said beater; driving mechanism for said beater and feeding means comprising a driving sprocket wheel rotating with said axle, a countershaft mounted on the upper portion of the vehicle body, a sprocket wheel at one side of the vehicle body mounted on and rotating with said countershaft, a link belt running over the latter sprocket wheel and movable into and out of engagement with said driving sprocket wheel, a rocking lever mounted on the vehicle body, a pinion carried by said lever for supporting said link belt as it is moved into and out of engagement with said driving sprocket wheel, means for rocking said lever to move said link belt into and out of operative engagement with said driving sprocket wheel, and means at the opposite side of the vehicle body and driven by said countershaft for actuating said feeding means.

17. In a manure spreader of the type comprising a vehicle body having a rotatable rear axle, a rotatable beater loosely mounted on said axle, and means for feeding manure to said beater; driving mechanism for driving said beater comprising a driving sprocket wheel rotating with said axle, a countershaft mounted on the vehicle body, a sprocket wheel mounted on and rotating with said countershaft, a link belt running over the latter sprocket wheel, a rocking lever mounted on the vehicle body, a pinion carried by said lever for supporting said link belt as it is moved into and out of engagement with said driving sprocket wheel, means for rocking said lever to move said link belt into and out of operative engagement with said driving sprocket wheel, and means for maintaining the tension on said belt as it is moved fore and aft.

18. In a manure spreader of the type comprising a vehicle body having a rotatable rear axle, a rotatable beater loosely mounted on said axle, and means for feeding manure to said beater; driving mechanism for said beater and feeding means comprising a driving sprocket wheel rotating with said axle, a countershaft mounted on the vehicle body, a sprocket wheel mounted on and rotating with said countershaft, a link belt running over the latter sprocket wheel, a rocking lever mounted on the vehicle body, a pinion carried by said lever for supporting said link belt as it is moved into and out of engagement with said driving sprocket wheel, means for rocking said lever to move said link belt into and out of operative engagement with said driving sprocket wheel, and adjustable means actuated by the rocking of said lever for maintaining the tension on said belt.

19. In a manure spreader of the type comprising a vehicle body having a rotatable rear axle, a rotatable beater loosely mounted on said axle, and means for feeding manure to said beater; driving mechanism for driving said beater comprising a driving sprocket wheel rotating with said axle, a countershaft mounted on the vehicle body, a sprocket wheel mounted on and rotating with said countershaft, a link belt running over the latter sprocket wheel, a rocking lever mounted on the vehicle body, a pinion carried by said lever for supporting said link belt as it is moved into and out of engagement with said driving sprocket wheel, an operating rod connected with said lever for rocking the same fore and aft to move said belt into and out of operative engagement with said driving sprocket wheel, a lever fulcrumed on the vehicle body and operatively connected with said rod, a belt tightening roller over which said belt runs, a movable support for said roller, and means connecting said support with the latter lever for moving said support to maintain the tension on said belt as it is moved fore and aft.

20. In a manure spreader of the type comprising a vehicle body having a rotatable rear axle, a rotatable beater loosely mounted on said axle, and means for feeding manure to said beater; driving mechanism for said beater and feeding means comprising a sprocket wheel rotating with said axle, sprocket wheels mounted on the vehicle body to rotate about the same transverse axis, said sprocket wheels being operatively connected together, a link belt running over one of said sprocket wheels and adapted to be actuated by said driving sprocket wheel to rotate said first mentioned sprocket wheels in the opposite direction, and a link belt driven by one of the latter sprocket wheels and operatively connected with said beater for driving the same in the same direction as the latter sprocket wheels.

21. In a manure spreader of the type comprising a vehicle body having a rotatable rear axle, a rotatable beater loosely mounted on said axle, and means operable to feed manure to said beater; driving mechanism for said beater and said feeding means comprising a countershaft mounted on the vehicle body, means operated by the rotation of said countershaft for intermittently actuating said feeding means, means for driving said countershaft from said axle, and means actuated by the rotation of said countershaft for rotating said beater at a higher rate of speed than the speed of said axle.

22. In a manure spreader of the type comprising a vehicle body having a rotatable rear axle, a rotatable beater loosely mounted on said axle, and a traveling apron for feeding manure to said beater; driving mechanism for said beater and said apron comprising a countershaft mounted on the vehicle body, means for driving said countershaft from said axle and in the opposite direction, means operated by the rotation of said countershaft for intermittently actuating said axle, and means for driving said beater from, and in the same direction as, said countershaft at a higher rate of speed than that of said apron.

23. In a manure spreader comprising a vehicle body having a rotatable rear axle, a main rotatable beater loosely mounted on said axle, and means for feeding manure to said beater, the combination with said elements of an auxiliary beater mounted on the upper portion of the vehicle body, and means actuated by the rotation of said axle for rotating said beaters faster than said axle but in the direction opposite to that in which said axle rotates.

24. In a manure spreader comprising a vehicle body having a rotatable rear axle, a main rotatable beater loosely mounted on said axle, and means for feeding manure to said beater, the combination with said elements of an auxiliary beater mounted on the upper portion of the vehicle body, means actuated by the rotation of said axle for rotating said beaters faster than said axle but in a direction opposite to that in which said axle rotates, and means driven by one of the vehicle wheels for intermittently actuating said feeding means.

25. In a manure spreader of the type comprising a vehicle body having a rotatable rear axle, a main rotatable beater loosely mounted on said axle, an auxiliary beater mounted on the upper portion of the vehicle body, and means for feeding manure to said main beater; driving mechanism comprising a countershaft mounted on the upper portion of the vehicle body and operatively connected with said auxiliary beater to rotate the same, means for driving the main beater from said countershaft and in the same direction, and means adapted to be actuated by said axle for driving said countershaft faster than said axle but in the opposite direction.

26. In a manure spreader of the type comprising a vehicle body having a rotatable rear axle, a main rotatable beater loosely mounted on said axle, means for feeding manure to said beater; driving mechanism comprising a countershaft mounted on the upper portion of the vehicle body, an auxiliary beater rotating with said countershaft, means for driving said countershaft from said axle, a rotary lateral distributor mounted on the vehicle in rear of said main beater, and means for driving said main beater and said lateral distributor from said countershaft and in the same direction.

27. In a manure spreader of the type comprising a vehicle body having a rotatable rear axle, a main rotatable beater loosely mounted on said axle, and means for feeding manure to said beater; driving mechanism comprising a driving sprocket wheel rotating with said axle, a countershaft mounted on the upper portion of the vehicle body, a pair of sprocket wheels mounted on said countershaft and rotating therewith, an auxiliary beater rotating with said countershaft, a lateral distributor mounted on the vehicle body in rear of said axle, a link belt for connecting said driving sprocket wheel with one of the sprocket wheels on said countershaft, and a link belt driven by the other sprocket wheel on said countershaft and operating to drive said main beater and said lateral distributor in the same direction as said countershaft.

28. A manure spreader comprising a vehicle body having a rear axle, a beater rotably mounted on said axle, a power driven element mounted on the vehicle body independently of said axle and eccentrically with respect to the axis of said beater, and means for driving the beater continuously from said element.

29. A manure spreader comprising a vehicle body having a rear axle, a beater rotatably mounted on said axle, a countershaft mounted on the vehicle body eccentrically with respect to the axis of said beater, means for driving the beater continuously from said countershaft, and means for driving said countershaft.

30. A manure spreader comprising a vehicle body having a rear axle, a beater rotatably mounted on said axle, a countershaft mounted on the vehicle body eccentrically with respect to the axis of said beater, means for driving the beater continuously from said countershaft, and means for driving said countershaft from said axle.

31. A manure spreader comprising a vehicle body having a rear axle, a beater rotatably mounted on said axle, a power driven element mounted on the vehicle body independently of said axle and eccentrically with respect to the axis of the beater, means for driving the beater from said element, and means for driving said element from said axle at increased speed.

ALBION STORM.

CERTIFICATE OF CORRECTION.

Patent No. 1,724,379.                                     Granted August 13, 1929, to

ALBION STORM.

It is hereby certified that error appears in the printed specification of the above numbered patent requiring correction as follows: Page 7, line 81, claim 22, for the word "axle" read "apron", and line 84, for the word "apron" read "axle"; page 8, lines 29 and 30, for the misspelled word "rotably" read "rotatably"; and that the said Letters Patent should be read with these corrections therein that the same may conform to the record of the case in the Patent Office.

Signed and sealed this 1st day of October, A. D. 1929.

(Seal)

M. J. Moore,
Acting Commissioner of Patents.

iary beater rotating with said countershaft, means for driving said countershaft from said axle, a rotary lateral distributor mounted on the vehicle in rear of said main beater, and means for driving said main beater and said lateral distributor from said countershaft and in the same direction.

27. In a manure spreader of the type comprising a vehicle body having a rotatable rear axle, a main rotatable beater loosely mounted on said axle, and means for feeding manure to said beater; driving mechanism comprising a driving sprocket wheel rotating with said axle, a countershaft mounted on the upper portion of the vehicle body, a pair of sprocket wheels mounted on said countershaft and rotating therewith, an auxiliary beater rotating with said countershaft, a lateral distributor mounted on the vehicle body in rear of said axle, a link belt for connecting said driving sprocket wheel with one of the sprocket wheels on said countershaft, and a link belt driven by the other sprocket wheel on said countershaft and operating to drive said main beater and said lateral distributor in the same direction as said countershaft.

28. A manure spreader comprising a vehicle body having a rear axle, a beater rotably mounted on said axle, a power driven element mounted on the vehicle body independently of said axle and eccentrically with respect to the axis of said beater, and means for driving the beater continuously from said element.

29. A manure spreader comprising a vehicle body having a rear axle, a beater rotatably mounted on said axle, a countershaft mounted on the vehicle body eccentrically with respect to the axis of said beater, means for driving the beater continuously from said countershaft, and means for driving said countershaft.

30. A manure spreader comprising a vehicle body having a rear axle, a beater rotatably mounted on said axle, a countershaft mounted on the vehicle body eccentrically with respect to the axis of said beater, means for driving the beater continuously from said countershaft, and means for driving said countershaft from said axle.

31. A manure spreader comprising a vehicle body having a rear axle, a beater rotatably mounted on said axle, a power driven element mounted on the vehicle body independently of said axle and eccentrically with respect to the axis of the beater, means for driving the beater from said element, and means for driving said element from said axle at increased speed.

ALBION STORM.

CERTIFICATE OF CORRECTION.

Patent No. 1,724,379.   Granted August 13, 1929, to

ALBION STORM.

It is hereby certified that error appears in the printed specification of the above numbered patent requiring correction as follows: Page 7, line 81, claim 22, for the word "axle" read "apron", and line 84, for the word "apron" read "axle"; page 8, lines 29 and 30, for the misspelled word "rotably" read "rotatably"; and that the said Letters Patent should be read with these corrections therein that the same may conform to the record of the case in the Patent Office.

Signed and sealed this 1st day of October, A. D. 1929.

(Seal)

M. J. Moore,
Acting Commissioner of Patents.

CERTIFICATE OF CORRECTION.

Patent No. 1,724,379.                                            Granted August 13, 1929, to

ALBION STORM.

It is hereby certified that error appears in the printed specification of the above numbered patent requiring correction as follows: Page 1, line 70, strike out the syllable "se-"; page 5, line 24, claim 3, strike out "a cam"; and that the said Letters Patent should be read with these corrections therein that the same may conform to the record of the case in the Patent Office.

Signed and sealed this 5th day of November, A. D. 1929.

(Seal)                                                                             M. J. Moore,
                                                                                  Acting Commissioner of Patents.